Oct. 10, 1939.   F. BISZANTZ   2,175,769
TIRE CARRIER AT THE REAR OF THE BODY
Original Filed March 31, 1938
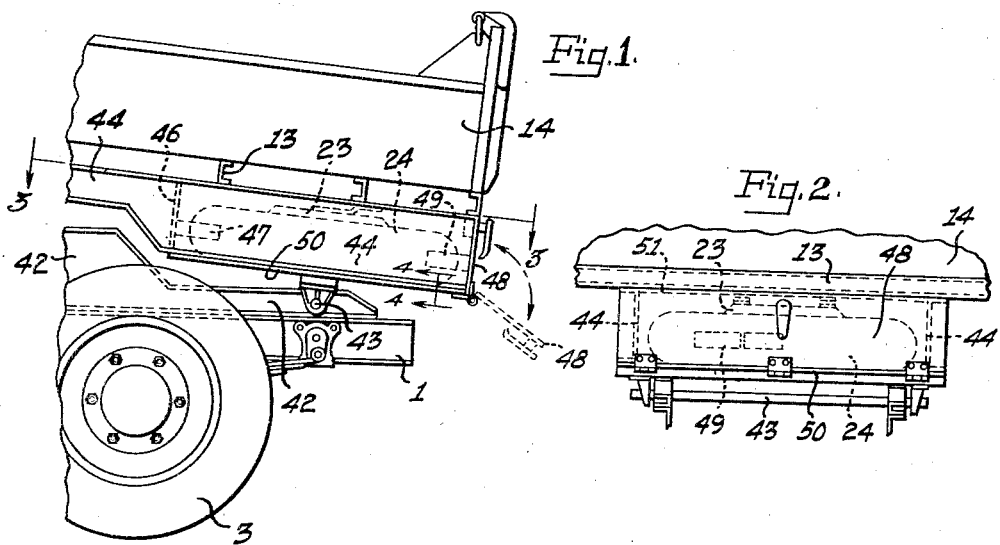
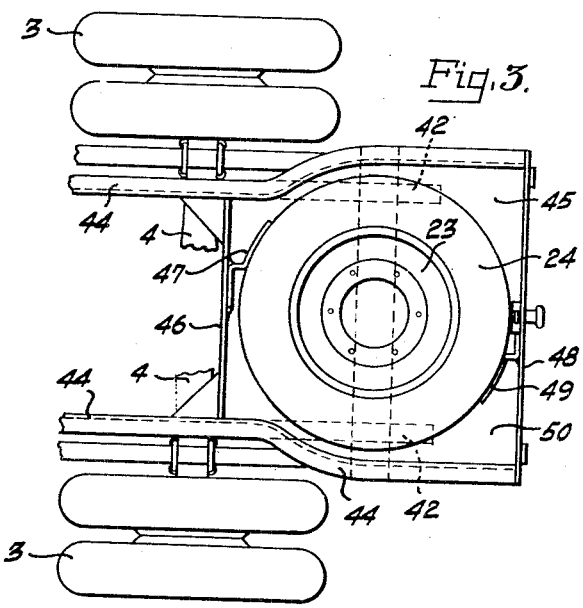
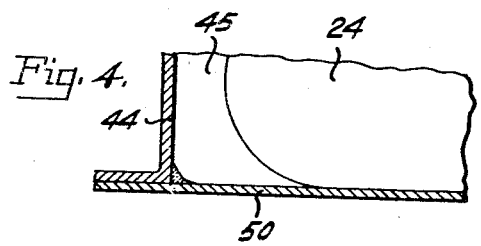
Inventor
FRED BISZANTZ Patented Oct. 10, 1939

2,175,769

UNITED STATES PATENT OFFICE 2,175,769

TIRE CARRIER AT THE REAR OF THE BODY

Fred Biszantz, Galion, Ohio, assignor to The Galion Metallic Vault Company, Galion, Ohio, a corporation of Ohio Original application March 31, 1938, Serial No. 199,213. Divided and this application November 28, 1938, Serial No. 242,674

2 Claims. (Cl. 298—1)

My invention relates to cargo-carrying trucks and, in particular, to means and methods of carrying tires and other equipment.

Heretofore, it has been a problem in the art to store tires in cargo-carrying trucks without interfering with the operation of the stationary or dump bodies, without shortening such bodies, or without interfering with the access to the engine or the cab. It has been a further problem because tires carried in exposed locations suffered rapid deterioration from light, heat, and other elements incident to the use of a truck.

It is an object of this invention to provide means in connection with the sub-frame of the vehicle to so mount the tire that it can still be supported within a tilting body, can be removed from the end of the vehicle and will not interfere with the tilting operation of the body.

This is a division of my application, Serial No. 199,213, filed March 31, 1938.

Referring to the drawing:

Figure 1 shows the rear end of a truck and tilting body with a tire carrier in the rear end with means for removing the tire from the rear of the vehicle;

Figure 2 is a rear elevation of Figure 1;

Figure 3 is a top plan view, taken on the line 3—3 of Figure 1, looking in the direction of the arrows, of a sub-frame at its rear end and the rear end of a truck, showing a tire support between said sub-frame and a tire compartment, and illustrating, in detail, the arrangement of such parts as are shown in elevation in Figures 1 and 2; and Figure 4 is a section on the line 4—4, looking in the direction of the arrows, of Figure 1.

Referring to the drawing in detail, I designates the longitudinal frame members of a truck having a cab 2 and wheels 3 mounted upon the axle 4.

As shown in the drawing, the tire compartment is formed in the intermediate frame supporting the truck body and travels with it when it is tilted.

The truck frame I has mounted thereon the intermediate frame members 42, to which is pivoted at 43 by connection to the body frame members 44, the body 14 which is mounted by its cross frame members 13 upon the frame members 44. The rear ends of these members 44 are spread apart, as seen in Figure 3, to form room for receiving a tire 24 in the compartment 45. The rear of this compartment is formed by a wall 46 having a positioning spring finger 47, while the front of the compartment is closed by the rear door 48 having a positioning spring finger 49. The bottom is formed by the plate 50 and the top by a cover plate 51. It is, therefore, possible, with this construction, to have access to the tire through the rear compartment which tilts with the body.

It will be understood that I desire to comprehend within my invention such modifications as come within the scope of the claims and the invention.

Having thus fully described my invention, what I claim as new and desire to secure by Letters Patent is:

1. In combination, a truck frame, a tiltable truck body, body frame members formed to make a compartment between said members at the rear of the body, a pivoted door at the rear of said compartment and pivot means between the truck and body frames permitting movement of said compartment with said body frame in conjunction with the movement of the body.

2. In combination, a truck having frame members, a tiltable body, frame members intermediate of and supported by said truck frame members, a tiltable body frame comprising longitudinal members and located between said body and the intermediate frame members and having pivotal connection with said last named frame members, a spare tire compartment located between the longitudinal members of the tiltable body frame at the rear of the body, means for supporting the body on said tiltable frame, and means for controlling access to said compartment from the rear of said tiltable frame.

FRED BISZANTZ.